United States Patent [19]

Shishido

[11] Patent Number: 4,575,703

[45] Date of Patent: Mar. 11, 1986

[54] DATA READING DEVICE FOR DATA PROCESSING APPARATUS

[75] Inventor: Kentaro Shishido, Tokyo, Japan

[73] Assignee: Sony Corporation, Tokyo, Japan

[21] Appl. No.: 511,927

[22] Filed: Jul. 8, 1983

[30] Foreign Application Priority Data

Jul. 22, 1982 [JP] Japan .......................... 57-111229[U]
Feb. 16, 1983 [JP] Japan .......................... 58-23996

[51] Int. Cl.$^4$ .......................................... G06K 13/04
[52] U.S. Cl. .................................. 235/479; 235/482
[58] Field of Search ............. 235/441, 482, 483, 485, 235/486, 492, 479, 436, 475; 360/99

[56] References Cited

U.S. PATENT DOCUMENTS

| | | | |
|---|---|---|---|
| 3,626,159 | 12/1971 | Chumley | 235/483 X |
| 3,883,856 | 5/1975 | Saito et al. | 235/441 X |
| 4,236,667 | 12/1980 | Crowley et al. | 235/479 X |
| 4,404,464 | 9/1983 | Moreno | 235/441 X |

Primary Examiner—David L. Trafton
Attorney, Agent, or Firm—Lewis H. Eslinger; Alvin Sinderbrand

[57] ABSTRACT

In a data processing apparatus, a device for reading data stored in a card is provided with a housing having a slit through which the card can be manually inserted and engaged by guides within the housing for movement in a predetermined path to an operative position, a slider member movable within the housing and having a portion interposed in the path of the card so as to be engaged by the latter and moved thereby, against the force of at least one spring, from an initial position to a displaced position upon insertion of the card through the housing slit to its operative position, a lock assembly engageable when the card is inserted to its operative position for holding the slider member in its displaced position against the force of the spring, and a lock release for disengaging the lock assembly and thereby permitting the spring to return the slider member to its initial position during which the card is propelled outwardly through the housing slit. A roller urged against the guided card within the housing frictionally resists separation of the card from the slider member when the latter is held in its displaced position and also during return of the slider member to its initial position. A muting circuit is made operative as the card moves to and from its operative position in which conductive terminals connected through a printed circuit with one or more data storage elements on the card are engaged with respective contact elements within the housing.

3 Claims, 9 Drawing Figures

DATA READING DEVICE FOR DATA PROCESSING APPARATUS

BACKGROUND OF THE INVENTION

1. Field of the Invention

This invention relates generally to data processing apparatus, and more particularly is directed to an improved device for such apparatus by which data stored in a card can be conveniently read out from the latter.

2. Description of the Prior Art

It is known to provide, as a data storage means, a plastic card, desirably of rectangular shape and of a size making it conveniently portable. A printed circuit board is sealed in a recess of the plastic card and has conductive terminals arranged in a suitable pattern on an exposed surface of the circuit board. Such conductive terminals are connected, through holes in the board, to respective portions of a printed circuit formed on the other or sealed surface of the board and being connected, in turn, to electrodes of a semi-conductor element in which there are incorporated a central processing unit (CPU), a read only memory (ROM), a random access memory (RAM) or the like in the form of an integrated circuit (IC) constituted by a metal oxide silicon element (C-MOS).

In a data processing apparatus according to the prior art adapted to use the above described plastic card as a stored data source, the card is inserted a relatively small distance through a slit provided therefor in a housing, and such insertion of the card is detected either optically or by a mechanical switch so as to cause operation of an electric motor. Operation of the motor serves to drive a card feed roller by which the card is further propelled to an operative position within the housing. The arrival of the card at such operative position is detected by another switch which halts the operation of the card driving motor, whereupon reading out of the data stored in the card operatively positioned is initiated. When it is desired to remove the data storage card from the apparatus, a button is depressed or actuated for causing still another switch to effect reverse operation of the electric motor by which the card feed roller is made to propel the card out of the housing slit. It will be appreciated that the foregoing device for reading the data storage card is inherently complex and cumbersome, and further is not particularly suited for use in a battery-powered data processing apparatus by reason of its reliance on a motor- driven roller for moving the card to and from its operative position.

OBJECTS AND SUMMARY OF THE INVENTION

Accordingly, it is an object of the present invention to provide a data processing apparatus with a device for reading a data storage card which avoids the above described disadvantages of the prior art devices.

More specifically, it is an object of this invention to provide a device for reading a data storage card which can be of small size, and which can be incorporated in a data processing apparatus which is battery powered.

Another object of this invention is to provide a device for reading a data storage card, as aforesaid, which is manually operable so as to avoid the need for providing an electrically powered motor.

A further object is to provide a device for reading a data storage card, as aforesaid, which is simplified by the omission of detecting switches and the like for sensing the position of the card.

According to an aspect of this invention, in a data processing apparatus, a device for reading data stored in a card comprises a housing having a slit adapted for the insertion of the card therethrough into the housing, guide means in the housing engageable with the card for guiding the latter in a predetermined path during the insertion of the card into the housing to an operative position in the latter, slider means movable within the housing and having a portion interposed in said predetermined path so as to be engaged by the card and moved by the latter in one direction from an initial position to a displaced position upon the insertion of the card through the housing slit to said operative position in the housing, spring means acting on the slider means and yieldably urging the latter in a direction opposite to said one direction, lock means engageable when the card is inserted to said operative position for holding said slider means in said displaced position against the force of said spring means, and lock releasing means for disengaging said lock means and thereby permitting said spring means to return said slider means to said initial position during which said slider means propels the card out of said housing through said slit.

Further, it is a feature of this invention to provide a device for reading data stored in a card, as aforesaid, with frictional drag means engageable with the card in said predetermined path for frictionally resisting separation of the card from said slider means when the card is held in said displaced position and also during said return of the the slider means to its initial position.

Still further, in the case where the card includes printed circuit means connecting data storage means on the card to a pattern of conductive terminals, and contact elements are supported within the housing in a pattern corresponding to the pattern of the conductive terminals on the card so as to be engageable with the respective conductive terminals when the card is in its operative position, the device for reading the stored data further desirably comprises muting means made operative upon the movement of the card to and from its operative position while the conductive terminals and contact elements are in relative sliding contact with each other.

The above, and other objects, features and advantages of the present invention, will be apparent in the following detailed description of illustrative embodiments thereof which is to be read in conjunction with the accompanying drawings in which corresponding parts are identified by the same reference numerals.

DESCRIPTION OF THE PREFERRED EMBODIMENTS

Figure 1:
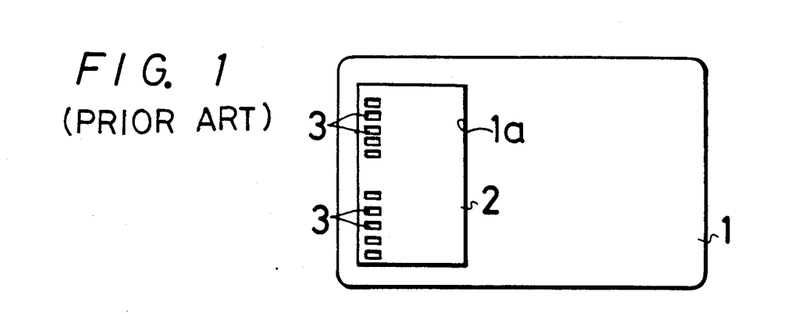
FIG. 1 is a plan view of a data storage card of a type which is adapted to be read by devices embodying the present invention.

Referring to the drawings in detail, and initially to FIG. 1 thereof, it will be seen that a data storage card 1 of a known type which is intended to be used in a stored data reading device according to this invention is desirably of rectangular shape and of a size making it conveniently portable. The card 1 is desirably formed of a suitable plastic, such as, for example, polyvinyl chloride, and is formed with a recess 1a in which a printed circuit board 2 is suitably sealed. The printed circuit board 2 is desirably located adjacent one end or a relatively short side of the rectangular card 1. A plurality of conductive terminals 3 are arranged in a suitable pattern on the exposed surface of circuit board 2 and are connected, through holes in board 2, to respective portions of a printed circuit (not shown) formed on the other or sealed surface of board 2 and connected, in turn, to electrodes of a semi-conductor element (also not shown) in which there are incorporated a central processing unit (CPU) a read only memory (ROM), a random access memory (RAM) or the like in the form of an integrated circuit (IC), for example, constituted by a metal oxide silicon element (C-MOS), for defining the stored data.

Figure 2:
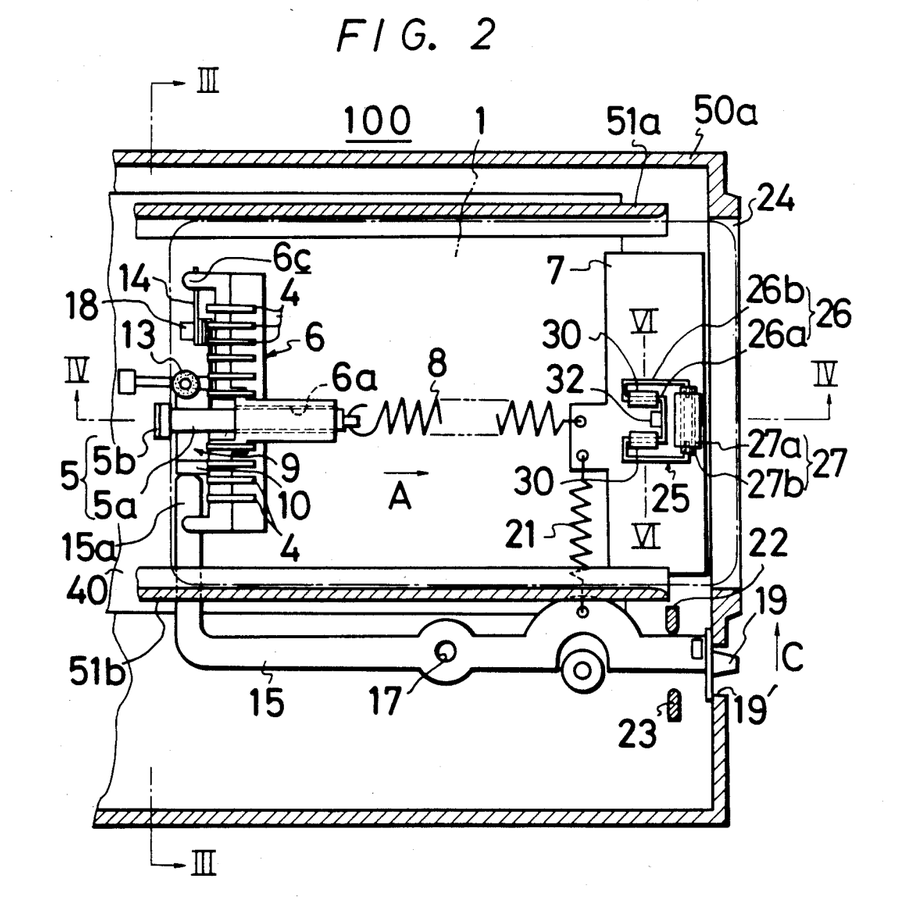
FIG. 2 is a sectional view, in a horizontal plane, of a portion of a data processing apparatus viewed from above and having a device according to one embodiment of the present invention for reading the data storage card of FIG. 1 which is shown, in dot-dash lines, in its operative position.

Referring now to FIGS. 2-6, it will be seen that, in a data processing apparatus 100, a device according to an embodiment of the invention for reading stored data from the card 1 generally comprises a housing 50 made up of upper and lower portions 50a and 50b, each desirably molded of a synthetic resin, with the upper housing portion 50a having an aperture or slit 24 in one side, for example, in the side at the right on FIG. 2, and being dimensioned to permit card 1 to be inserted therethrough into housing 50. Upper housing portion 50a is further shown to be formed with a pair of parallel guides 51a and 51b engageable by the card 1 inserted through slit 24 for guiding the card in a predetermined rectilinear path to an operative position shown in dot-dash lines on FIG. 2. The guides 51a and 51b are desirably formed as parallel, spaced apart channels having substantially U-shaped cross-sections opening toward each other to define recesses 52 (FIG. 3) in which the opposite longitudinal edges of the rectangular card 1 are slidably received.

A slider member 5 is movably mounted within housing 50 so as to be engageable by the leading end of the card 1 as the latter is manually moved to its operative position along the path defined by guides 51a and 51b. More particularly, in the embodiment being here described, slider member 5 is shown to be of generally T-shaped configuration so as to include an elongated stem 5a and a cap or head extending across one end of stem 5a and including an abutment portion 5b at one end and a keeper portion 5c at the other end formed with a curved, slanting surface. The elongated stem 5a of slider member 5 is desirably of non-circular cross-section and is rectilinearly slidable in a similarly cross-sectioned bore 6a of a mounting member 6. Mounting member 6 is suitably secured on a fixed support member 40 within housing 50 with the axis of bore 6a parallel to, and approximately midway between guides 51a and 51b at a location along the latter remote from slit 24. The T-shaped slider member 5 is arranged with its abutment portion 5b extending from stem 5a normal to the plane of the card 1 guides by guides 51a and 51b so that the end of abutment portion 5b is interposed in the path of card 1. A helical tension spring 8 is connected, at one end, to the free end of stem 5a and, at its other end, to a mounting plate 7 fixed within housing 50 adjacent slit 24 so that spring 8 will yieldably urge slider member 5 relative to fixed mounting member 6 in the direction of the arrow A on FIG. 2 to an initial position (not shown) in which the head or cap of slider member 5 bears against a surface 6b (FIGS. 4 and 5) on mounting member 6 at an end of bore 6a. When card 1 is inserted through slit 24 and manually propelled along guides 51a and 51b to its operative position (FIGS. 2 and 5), the leading end edge of card 1 comes into engagement with abutment portion 5b of slider member 5 which is thereby moved from its initial position against the force of spring 8 to a displaced position at which a latch element 9 cooperates with keeper portion 5c of slider member 5 to define a lock assembly for releasably holding slider member 5 in its displaced position against the force of spring 8.

Figure 3:
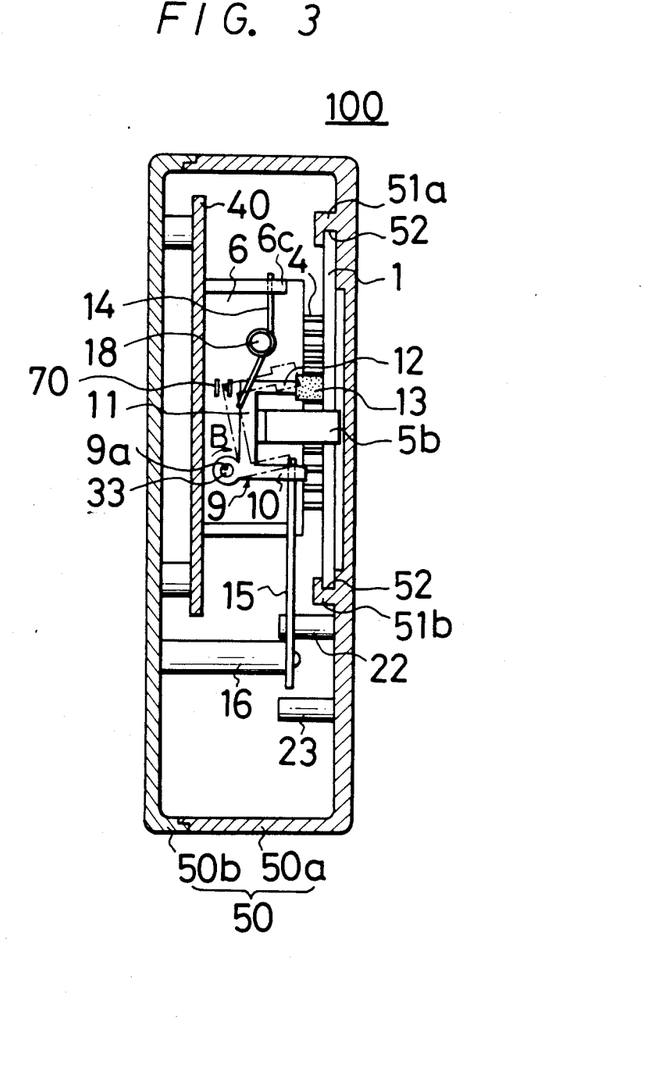
FIG. 3 is a cross-sectional view taken along the line III—III on FIG. 2.
Figure 4:
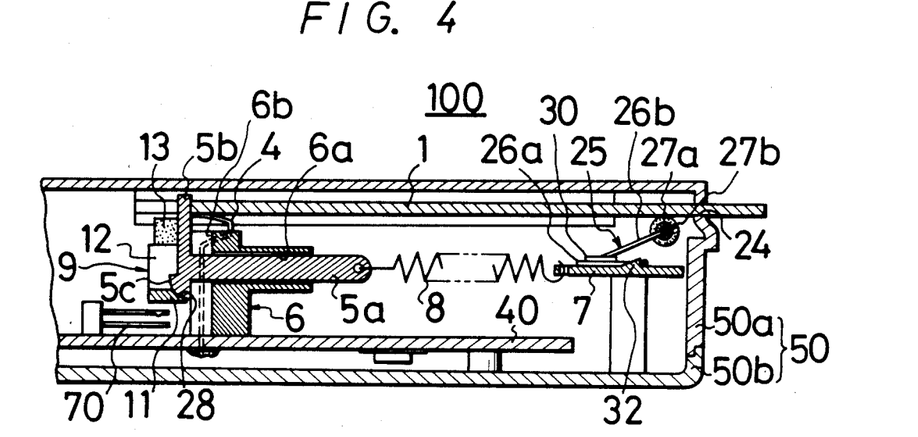
FIG. 4 is a cross-sectional view taken along the line IV—IV on FIG. 2, but with the data storage card located just short of its operative position.
Figure 5:
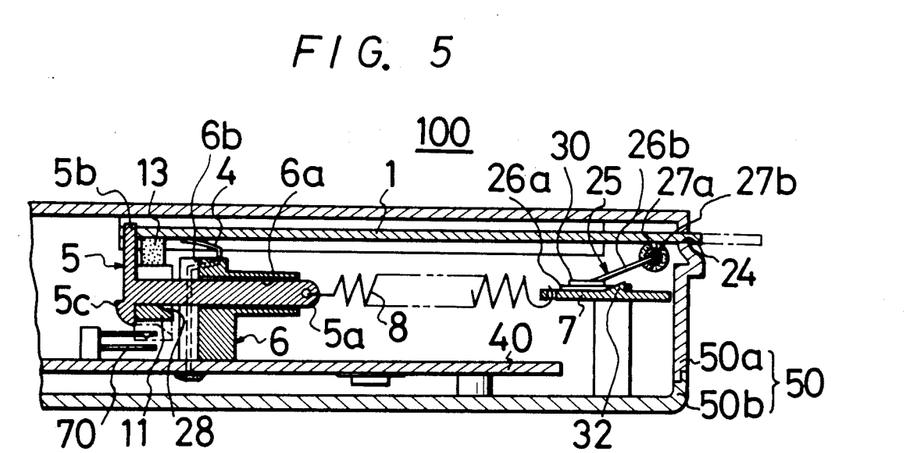
FIG. 5 is a sectional view similar to that of FIG. 4, but showing the data storage card in its operative position.
Figure 6:
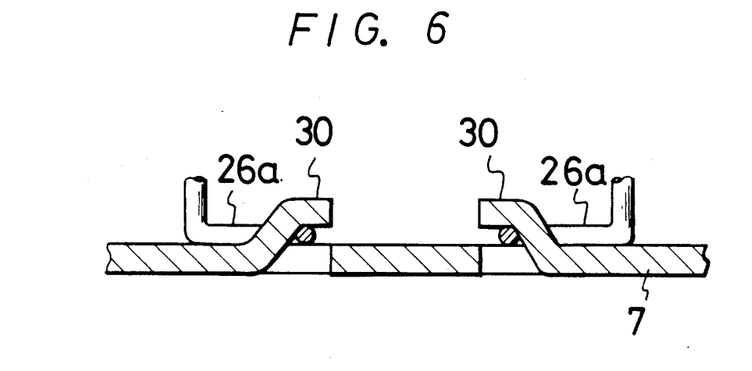
FIG. 6 is an enlarged sectional view taken along the line VI—VI on FIG. 2.

As shown particularly on FIG. 3, in the embodiment of the invention being presently described, latch element 9 includes integral arms 10, 11 and 12 arranged in succession at right angles to each other to provide latch element 9 with a substantially C-shaped configuration. Latch element 9 has a bore 9a at the corner between arms 10 and 11 by which latch element 9 is pivotally mounted on a pin 33 extending from mounting member 6. A rubber cap 13 is suitably secured on the free end portion of arm 12 and is frictionally engageable against a side surface of card 1 adjacent the inner end of the latter when the card is at its operative position. A torsion spring 14 is mounted on a pin 18 extending from mounting member 6 and has one end in bearing engagement against a lug 6c on mounting member 6 while the other end of torsion member 14 acts against arm 11 of latch element 9 for urging the latter in the direction of the arrow B, that is, in the clockwise direction, as viewed on FIG. 3. Such angular movement of latch element 9 by spring 14 is effective to bring arm 11 of latch element 9 into the path of travel of abutment portion 5c of slider member 5, as is clearly shown on FIGS. 4 and 5. Further, arm 11 of latch element 9 is shown to have an inclined surface 28 thereon for cooperation with the curved, slanting surface of abutment portion 5c of the slider member. Thus, as slider member 5 is being moved toward its displaced position against the force of spring 8, the curved, slanting surface of abutment portion 5c acts on inclined surface 28 (FIG. 4) and deflects latch element 9 angularly, for example, to the position shown in dot-dash lines on FIG. 3, until slider member 5 attains its displaced position (FIG. 5). Angular deflection of latch element 9 to the position shown in dot-dash lines on FIG. 3 moves rubber cap 13 away from the path of card 1 so as to avoid interference with movement of the card to its operative position. When slider member 5 attains its displaced position corresponding to the operative position of card 1, torsion spring 14 is effective to return latch element 9 to the position shown in full lines on FIG. 3, and in which arm 11 of the latch element engages in back of abutment portion 5c of the slider member for holding the latter in its displaced position. Furthermore, with arm 11 of latch element thus engaged in back of abutment portion 5c of the slider member, the rubber cap 13 on arm 12 engages against the side surface of card 1 for frictionally holding card 1 in its operative position.

With card 1 thus disposed in its operative position, the conductive terminals 3 thereof are engaged with corresponding resilient metal contact elements 4 which are insert molded in mounting member 6 and connected, as by soldering, to a printed circuit board which constitutes or is part of the fixed support member 40. Preferably, a muting switch 70 is also mounted on circuit board 40 adjacent latch element 9 so as to be actuable by arm 11 of the latch element when the latter is pivoted from the position shown in full lines on FIG. 5 to the position there shown in dot-dash lines, for example, by the movement of abutment portion 5c of slider member 5 past latch element 9. In other words, muting switch 70 is turned OFF so long as arm 11 of latch element 9 is moved away from muting switch 70 by the action of spring 14 on the latch element. Thus, with card 1 in its operative position, muting switch 70 is turned OFF and the contact elements 4 fixedly engaging the respective conductive elements 3 on the card 1 can complete a circuit for reading out the data stored in such card to data processing circuits associated with circuit board 40. On the other hand, as card 1 is being moved to and from its operative position, at which times, contact elements 4 are in sliding engagement with conductive terminals 3 so that a sliding noise would result, the angular displacement of latch element 9 against the force of spring 14 for moving arm 11 to the position shown in dot-dash lines on FIG. 5 is effective to turn ON muting switch 70 and thereby suitably avoid the transmission of sliding noise to the data processing circuits.

As shown particularly on FIG. 2, the device for reading stored data from card 1 further comprises a lock releasing means in the form of a lever 15 having a bore 17 intermediate its ends which is pivotally mounted on a support pin 16 extending within housing 50 from the lower housing portion 50b. One arm of lever 15 is substantially L-shaped and terminates in an end portion 15a which engages laterally against arm 10 of latch element 9. A helical tension spring 21 is connected between the other arm of lever 15 and fixed mounting plate 7 for urging lever 15 to pivot in the direction of the arrow C, that is, in the counterclockwise direction as viewed on FIG. 2, whereby to move end 15a of the lever away from arm 10 of latch element 9. Projections 22 and 23 extend from upper housing portion 50a at opposite sides of lever 15 (FIGS. 2 and 3) for limiting the angular displacements of the latter. The end portion of lever 15 remote from end 15a is secured to a knob 19 which protrudes from housing 50 through an aperture 19' in the latter. It will be appreciated that lever 15 is normally urged by spring 21 to the position shown on FIG. 2 in which the lever engages the stop or projection 22 and the end 15a of the lever limits the movement of latch element 9 by torsion spring 14 to the position shown in full lines on FIG. 3. However, when knob 19 is manually displaced in the direction opposite to the arrow C on FIG. 2, end 15a of lever 15 acts against arm 10 of latch element 9 for displacing the latter to the position shown in dot-dash lines on FIG. 3.

The illustrated device according to this invention for reading stored data from the card 1 is further shown to comprise a frictional drag means 25 (FIGS. 2, 4 and 5) engageable with the card as the latter is movable along guides 51a and 51b for frictionally resisting separation of card 1 from abutment portion 5b of slider member 5 when the latter is held in its displaced position (FIG. 5) and also during return of the slider member 5 by spring 8 to its initial position. More particularly, the frictional drag means 25 is shown to include a roller 27 when is desirably constituted by a rubber sleeve 27a secured on a cylindrical core 27b of metal or plastic, and a resilient mounting 26 for supporting roller 27 adjacent slit 24 and resiliently urging the roller 27 against a surface of card 1 as the latter is moved through slit 24 in the path defined by guides 51a and 51b. In the embodiment of the invention being here described, the resilient mounting 26 for roller 27 is shown to be in the form of a bent wire spring member having an intermediate U-shaped portion 26a from which parallel arms 26b resiliently extend in a plane that is angularly displaced from the plane of intermediate portion 26a, as shown on FIGS. 4 and 5. The free end portions of arms 26b are bent toward each other and extend into bores at the opposite ends of core 27b of roller 27 for rotatably journaling the latter. Tabs 30 are struck from mounting plate 7 to define recesses in which the sides of the U-shaped intermediate portion 26a of wire spring 26 are engaged, as clearly shown on FIG. 6. Further, a claw 32 is struck from mounting plate 7 and engages the bight of intermediate portion 26a for completing the secure attachment of the latter to mounting 7. By reason of the angular displacement of the plane of arms 26b from the plane of intermediate portion 26a of wire spring member 26, roller 27 is resiliently urged against the card 1 when the latter is moved along guides 51a and 51b for exerting a frictional drag on such movement of the card.

The previously described embodiment of the invention operates as follows:

The operator of the data processing apparatus 100 manually inserts card 1 into housing 50 through slit 24 with the conductive terminals 3 of card 1 being disposed at the underside thereof. As card 1 is manually inserted into housing 50 in the path established by guides 51a and 51b, the leading end edge of card 1 comes into engagement with abutment portion 5b of slider member 5 so as to effect movement of the latter from its initial position toward its displaced position against the force of spring 8. In the course of such movement of slider member 5, the curved surface of its keeper portion 5c rides against the inclined surface 28 of arm 11 of latch element 9 so as to angularly displace the latter to the position in dot-dash lines on FIG. 3. Such angular displacement of latch element 9 withdraws the rubber cap 13 thereon from the path of card 1 for permitting the final movement of the latter to its operative position. When card 1 attains its operative position, the corresponding movement of slider member 5 to its displaced position (FIG. 5) permits spring 14 to return latch element 9 to its engaged position shown in full lines on FIG. 3 and in which rubber cap 13 bears against a surface of card 1 and arm 10 of the latch element engages in back of keeper portion 5c for holding slider member 5 in its displaced position against the force of spring 8. Thus, after card 1 has been manually moved to its operative position, the operator can release the card 1 which is retained in its operative position by reason of the engagement of latch element 9 with keeper portion 5c on slider member 5, and further by reason of the frictional engagement of rubber cap 13 and of rubber surfaced roller 27 with the surface of card 1 which is thereby held against separation from abutment portion 5b. As earlier noted, during the final movement of card 1 to its operative position, the conductive terminals 3 thereon are slidably engaged with the respective contact elements 4, but muting switch 70 is actuated, in response to angular displacement of latch element 9 to the position shown in broken lines on FIG. 5, so as to avoid the transmission of any sliding noise to associated data processing circuits. Of course, when card 1 finally attains its operative position and latch element 9 is returned to the position shown in full lines on FIG. 5 for locking slider member 5 in its displaced position, muting switch 70 is no longer actuated so that the fixed engagement of contact elements 4 with the respective conductive terminals 3 on the operatively positioned card 1 can serve to transmit data read out of the memory or other elements on card 1 to the data processing circuits on printed circuit board 40.

When it is desired to remove the data storage card 1 from the reading device embodying this invention, knob 19 is manually displaced in the direction opposed to the arrow C on FIG. 2 so that end 15a of lever 15 acts against arm 10 of latch element 9 for angularly displacing the latter to the position shown in dot-dash lines on FIG. 3. Such angular displacement of latch element 9 disengages its arm 11 from keeper portion 5c of slider member 5 so that spring 8 can then act to displace slider member 5 in the direction of the arrow A on FIG. 2 for return of slider member 5 to its initial position. During such return of slider member 5 to its initial position, abutment portion 5b of the slider member acts against the adjacent end edge of card 1 for similarly moving the latter with the result that an end portion of card 1 is made to project from housing 50 through slit 24. During such movement of card 1, roller 27 continues to be resiliently urged against the surface of card 1 so as to exert a frictional drag upon the movement of the card. By reason of the foregoing, rapid movement of card 1 and its separation from abutment portion 5b of slider member 5 with consequent violent ejection of the card from the housing 50 are avoided.

Figure 7:
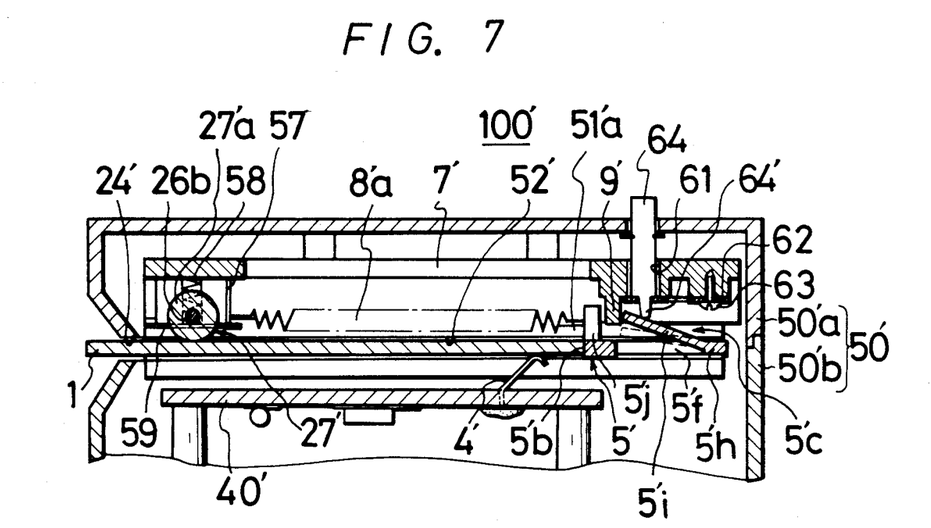
FIG. 7 is a sectional view generally similar to that of FIG. 5, but showing a device according to another embodiment of this invention for reading a data storage card.
Figure 8:
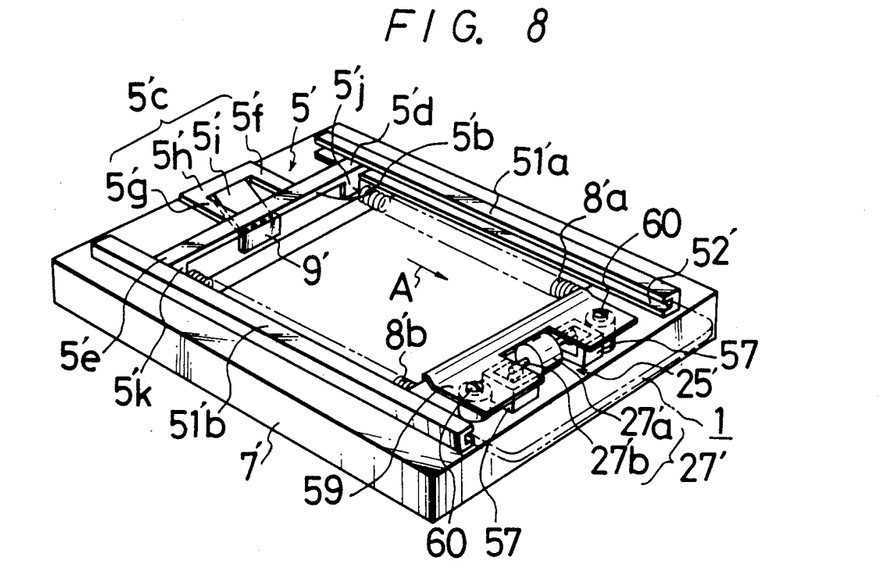
FIG. 8 is an inverted perspective view showing some of the elements of the device of FIG. 7.
Figure 9:
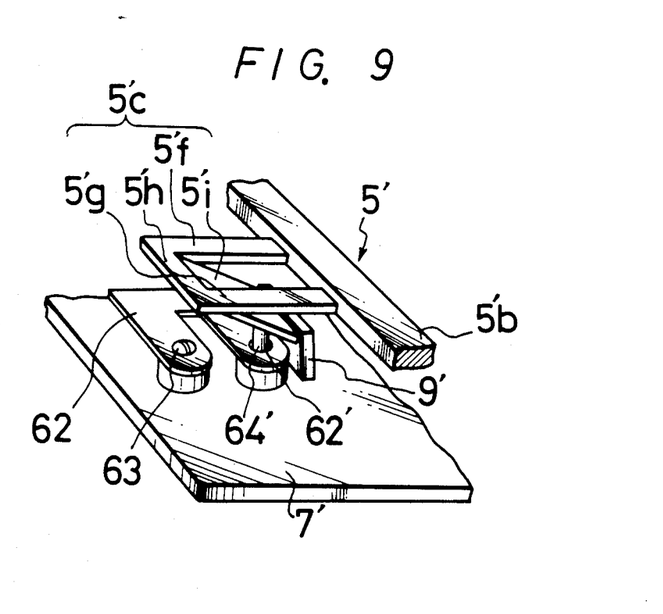
FIG. 9 is an enlarged perspective view showing details of the device illustrated by FIGS. 7 and 8.

Referring now to FIGS. 7-9 in which parts corresponding to those described with reference to FIGS. 2-6 are identified by the same reference numerals, but with primes appended thereto, it will be seen that, in a data processing apparatus 100', a stored data reading device according to another embodiment of this invention has its guides 51'a and 51'b formed as integral parts of a chassis 7' which may be molded of a suitable synthetic resin. Further, in this case, slider member 5' has opposite portions 5'd and 5'e which are received slidably in recesses 52' of guides 51'a and 51'b, respectively. Thus, guides 51'a and 51'b perform the dual functions of guiding card 1 inserted through slit 24' in a predetermined path within housing 50', and also of guiding slider member 5' which is engageable, at a surface 5'b, with an end edge of the inserted card 1. The opposite end portions of slider member 5' further have spring anchors 5'j and 5'k integral therewith for attachment to respective ends of helical tension springs 8'a and 8'b which, at their other ends, are suitably attached to chassis 7' adjacent slit 24' so that slider member 5' is yieldably urged by such springs in the direction of the arrow A on FIG. 8.

Further, in the embodiment of the invention illustrated in FIGS. 7-9, the lock assembly for releasably holding slider member 5' in its displaced position against the force of springs 8'a and 8'b includes a resilient latch element 5'c integral with slider member 5', and a fixed keeper element 9' extending from chassis 7' for engagement with resilient latch element 5'c. As particularly shown on FIG. 9, resilient latch element 5'c formed integrally with slider member 5' includes parallel, spaced apart arms 5'f and 5'g extending from the midportion of slider member 5' in the direction away from surface 5'b engageable by card 1, and a cross piece 5'h extending between arms 5'f and 5'g. An inclined latch finger 5'i extends integrally from cross piece 5'h in the direction toward slider member 5' and, at its free end edge, is engageable with keeper element 9' which extends into the path of travel of latch finger 5'i with slider member 5'.

In the embodiment of FIGS. 7-9, the frictional drag means 25' is again shown to include a roller 27' constituted by a rubber sleeve 27'a secured on a cylindrical metal or plastic core 27'b having journals extending from its opposite ends to be rotatably received in bearing members 57 fixed on chassis 7'. Such bearing members 57 define respective bearing channels extending normal to the plane of the card 1 in the path established by guides 51'a and 51'b so that, when the journals of roller 27' are received in the channels of bearing members 57, roller 27' can move toward and away from the plane of card 1 while being constrained from moving in the direction along the card. Springs 58 (FIG. 7) are disposed in the channels of bearing members 57 to act on the respective journals of roller 27' for urging the latter against card 1. A cover 59 is secured over the channels of bearing members 57, as by screws 60 (FIG. 8) for holding the journals of roller 27' in the channels of the bearing members 57 against the forces of the springs 58.

As shown particularly on FIG. 7, in the embodiment of the invention being presently described, the lock releasing means includes a release pin 64 slidable axially in a bore 61 formed in chassis 7' and projecting, at one end, from housing 50'. The other or inner end of release pin 64 has a reduced diameter projection 64' which, in the displaced position of slider member 5' shown on FIG. 7, is engageable with the inclined latch finger 5'i. A leaf spring 62 (FIGS. 7 and 9) is secured at one end, as by a screw 63, to chassis 7' and has an aperture 62' adjacent its other end through which there extends the reduced diameter projection 64' of release pin 64. Leaf spring 62 is operative to hold release pin 64 upwardly in the position shown on FIG. 7, and in which the upper end portion of release pin 64 projects a substantial distance out of housing 50'.

The embodiment of the invention described with reference to FIGS. 7-9 operates as follows:

Once again, the card 1 from which stored data is to be read is manually inserted through slit 24' into housing 50' with the conductive terminals 3 of the card being disposed at the underside thereof. As the card 1 is inserted into housing 50' in a path determined by guides 51'a and 51'b, the leading edge of the card engages surface 5'b on slider member 5' so as to propel the latter along the guides 51'a and 51'b against the force of springs 8'a and 8'b. As card 1 nears its operative position in housing 50', inclined latch finger 5'i rides under keeper element 9' and is deflected by the latter, for example, to the position shown in broken lines on FIG. 7. However, when card 1 attains its operative position so as to dispose slider member 5' in its displaced position shown on FIG. 7, latch finger 5'*i* can resiliently return to its normal position with the edge of the latch finger engaging in back of keeper element 9' so as to lock slider member 5' in its displaced position against the force of springs 8'*a* and 8'*b*. By reason of the frictional drag exerted on card 1 by roller 27', card 1 remains in its operative position against slider member 5' so as to maintain engagement of the conductive elements of card 1 with the respect contact elements 4' extending from the circuit 40'. Thus, information or data stored in the memory or memories of card 1 can be read out and processed by data processing means associated with circuit board 40'.

When it is desired to remove card 1 from housing 50', release pin 64 is manually depressed so that its projection 64' will deflect latch finger 5'*i* to the position shown in broken lines on FIG. 7 and thereby release the latch finger from keeper element 9'. Upon such release of latch fingers 5'*i* from keeper element 9', springs 8'*a* and 8'*b* are free to return slider member 5' to its initial position and thereby propel card 1 along guides 51'*a* and 51'*b* out of slit 24'. Of course, during such movement of card 1, roller 27' again exerts a frictional drag thereon to ensure that the card with not be violently ejected from the housing.

Of course, in the embodiment of the invention shown on FIGS. 7-9, the positions of the keeper element 9' and the latch element 5'*c* can be reversed. In other words, the keeper element 9' can be integrally formed on slider member 5' while the latch element 5'*c* is integrally formed as part of the chassis 7'. In that case, the lock release pin 64 can be arranged to release the latch element 5'*c* from the keeper element 9' in response to the exertion of an upward pull on the release pin.

The data processing apparatus 100 or 100' embodying a device according to this invention for reading stored data from a card 1 may further include, for example, a timer circuit, a sound synthesizer, an amplifier, a speaker, a time setting knob and an operating knob (all not shown). In such case, the IC element of card 1 may be in the form of a memory storing various kinds of information sound or audio data and synthesizer. When such card 1 is loaded in the data processing apparatus 100 or 100', the operating knob may be manipulated to select a predetermined information sound to be emitted from the speaker when the timer circuit detects the arrival of a preset time. Similarly, the card 1 loaded in the apparatus 100 or 100' may have, in its memory, data corresponding to the time differences between various cities. In such case, by manipulation of the operating knob, the apparatus may be made to display or announce the times in any selected cities.

The foregoing, are, of course, only illustrative of the possible uses of devices according to this invention for reading data storage cards 1, and many other applications of such devices will be readily apparent to those skilled in the art.

Further, although illustrative embodiments of the invention have been described in detail herein with reference to the accompanying drawings, it will be understood that the invention is not limited to those precise embodiments, and that various changes and modifications may be effected therein by one skilled in the art without departing from the scope or spirit of the invention as defined in the appended claims.

What is claimed is:

1. In a data processing apparatus, a device for reading data stored in a card comprising:
    a housing having a slit adapted for the insertion of the card therethrough into said housing;
    guide means in said housing engageable with the card for guiding the latter in a predetermined path during insertion of the card into said housing to an operative position in the latter;
    slider means movable within said housing and having a portion interposed in said path so as to be engaged by the card and moved by the latter in one direction from an initial position to a displaced position upon the insertion of the card through said slit to said operative position in said housing;
    spring means acting on said slider means and yieldably urging the latter in a direction opposite to said one direction;
    lock means engageable when said card is inserted to said operative position for holding said slider means in said displaced position against the force of said spring means;
    lock releasing means for disengaging said lock means and thereby permitting said spring means to return said slider means to said initial position during which said slider means propels the card out of said housing through said slit; and
    frictional drag means engageable with the card in said predetermined path for frictionally resisting separation of the card from said slider means when the card is held in said displaced position and also during said return of the slider means to its initial position, said frictional drag means including a rotatable roller, and means mounting said roller adjacent said slit at one side of said path and resiliently urging said roller against a surface of the card in said path, said means mounting the roller including a bent wire spring member having end portions on which said roller is rotatably journalled and an intermediate portion angularly displaced from said end portions, and support means to which said intermediate portion of the spring member is secured so that the angular displacement of said end portions relative to said intermediate portion achieves said resilient urging of the roller against the card.

2. In a data processing apparatus, a device for reading data stored in a card comprising:
    a housing having a slit adapted for the insertion of the card therethrough into said housing;
    guide means in said housing engageable with the card for guiding the latter in a predetermined path during insertion of the card into said housing to an operative position in the latter;
    slider means movable within said housing and having a portion interposed in said path so as to be engaged by the card and moved by the latter in one direction from an initial position to a displaced position upon the insertion of the card through said slit to said operative position in said housing;
    spring means acting on said slider means and yieldably urging the latter in a direction opposite to said one direction;
    lock means engageable when said card is inserted to said operative position for holding said slide means in said displaced position against the force of said spring means;

lock releasing means for disengaging said lock means and thereby permitting said spring means to return said slider means to said initial position during which said slider means propels the card out of said housing through said slit; and frictional drag means engageable with the card in said path for frictionally resisting separation of the card from said slider means when the card is held in said displaced position and during said return of the slider means to said initial position, said frictional drag means including a rotatable roller, and means mounting said roller adjacent said slit at one side of said path and resiliently urging said roller against a surface of the card in said path, said means mounting the roller including journals extending from the opposite ends of said roller, fixed support means including spaced apart bearing members defining bearing channels extending normal to the plane of the card in said path and rotatably receiving said journals while permitting bodily movement of said roller toward and away from said path, and springs in said bearing channels acting on said journals for effecting said resilient urging of the roller against said surface of the card.

3. In a data processing apparatus, a device for reading data stored in a card comprising:

a housing having a slit adapted for the insertion of the card therethrough into said housing;

guide means in said housing engageable with the card for guiding the latter in a predetermined path during insertion of the card into said housing to an operative position in the latter;

slider means also guided by said guide means for movement within said housing and having a portion interposed in said path so as to be engaged by the card and moved by the latter in one direction from an initial position to a displaced position upon the insertion of the card through said slit to said operative position in said housing;

spring means acting on said slider means and yieldably urging the latter in a direction opposite to said one direction;

lock means engageable when said card is inserted to said operative position for holding said slider means in said displaced position against the force of said spring means, said lock means including a resilient latch element integral with said slider means and normally extending from the latter at an angle to said path, and a fixed keeper element projecting toward said path and flexing said latch element as the latter moves past said keeper element in correspondence to movement of said slider means to said displaced position whereupon said latch element returns to its normally extending condition and engages said keeper element for holding said slider means in said displaced position; and lock releasing means for disengaging said lock means and thereby permitting said spring means to return said slider means to said initial position during which said slider means propels the card out of said housing through said slit, said lock releasing means including a slidable release pin projecting from said housing and having an inner end abutting said resilient latch element when said slider means is in said displaced position thereof, said pin being operative, when manually depressed, to flex said resilient latch element out of engagement with said keeper element and thereby permit said spring means to return said slider means to said initial position.

* * * * *